Feb. 14, 1956          W. L. BOND          2,734,317
TECHNIQUE AND APPARATUS FOR MAKING CRYSTAL SPHERES
Filed Dec. 22, 1953          2 Sheets-Sheet 1
*FIG. IA*
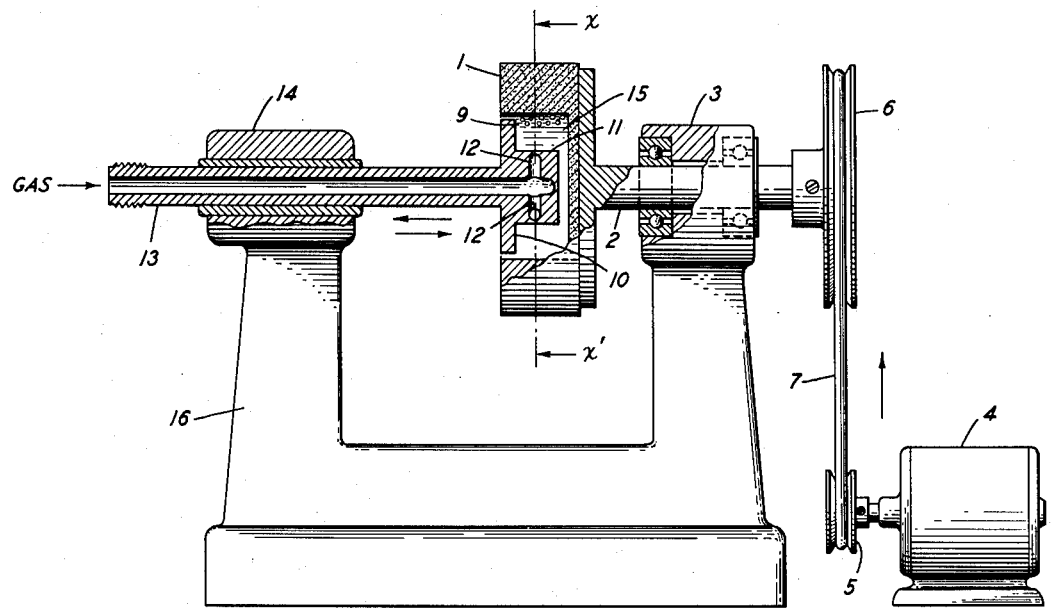
*FIG. IB*
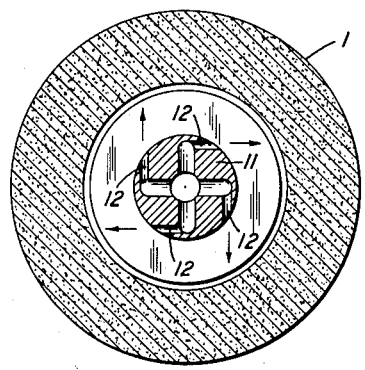
INVENTOR
W. L. BOND
BY
H. O. Wright
ATTORNEY Feb. 14, 1956    W. L. BOND    2,734,317
TECHNIQUE AND APPARATUS FOR MAKING CRYSTAL SPHERES
Filed Dec. 22, 1953    2 Sheets-Sheet 2

INVENTOR
W. L. BOND
BY
H. O. Wright
ATTORNEY

United States Patent Office 2,734,317
Patented Feb. 14, 1956

2,734,317

TECHNIQUE AND APPARATUS FOR MAKING CRYSTAL SPHERES

Walter L. Bond, New Providence, N. J., assignor to Bell Telephone Laboratories, Incorporated, New York, N. Y., a corporation of New York Application December 22, 1953, Serial No. 399,719

10 Claims. (Cl. 51—73)

This invention relates in general to the grinding of small spheres, and more specifically to the preparation of carbon microphone materials comprising spherical particles.

Spherical particles approximating a millimeter or less in diameter are utilized for numerous experimental and industrial applications, and are prepared by diverse methods which vary in accordance with the materials from which they are formed.

Of particular interest in telephony, is the preparation of carbon particles for use in microphones and for similar applications. For these purposes, research has indicated that spherical shaped particles are preferable, because more of them fit into a given volume, forming an aggregate which is characterized by more predictable electrical and mechanical behavior than in the case of random-shaped particles.

A number of different prior art methods have been used to prepare spherical carbon microphone material. These include chemical polymerization, and heat treatment of matrix particles in an organic gaseous atmosphere to produce a smooth carbon coating.

One of the principal disadvantages found in the use of carbon microphone particles prepared by the processes indicated above is that their electrical characteristics vary substantially with use.

In order to more closely control the specific chemical and/or physical characteristics of spherical particles prepared for microphone material, or for other applications, it is sometimes preferred to avoid high temperature or chemical treatment, and to substitute therefor mechanical methods of grinding or preparing the particles.

In accordance with a method recently described by the present inventor in the Review of Scientific Instruments, vol. 22, No. 5, May 1951, pages 344 and 345, work particles to be formed into spheres are disposed to impinge on a disk rotating at a high angular velocity, from which they are thrown against a cylindrical abrasive track. In a modification disclosed, a high speed jet of air is utilized to drive the particles against the stationary abrasive surface. In a later modification disclosed by P. Senio and C. W. Tucker, Jr. in the Review of Scientific Instruments, vol. 24, No. 7, July 1953, page 549, the cylindrical track disclosed by Bond is replaced by an abrasive wheel, against the inner surface of which the sphere-forming particles are rotated.

These methods are subject to certain disadvantages. For example, the fixed jet of air constantly blowing in the same place on the inner surface of the abrading surface distorts the cylindrical shape by wearing the walls excessively where the jet impinges, so that the processed particles no longer roll and spin, and are not evenly distributed, causing the abrading process to be unduly protracted.

The broad object of the present invention is improvement in the mechanical preparation of small spheres having a diameter approximating a millimeter or less. A more particular object of the present invention is to increase the speed at which spherical particles may be mechanically processed, specifically, by eliminating or greatly reducing those factors which contribute to uneven wearing on the interior surface of the abrading apparatus.

This and other objects are attained in accordance with the present invention in an apparatus in which jets of air are arranged at different points with respect to the inner cylindrical surface of a rapidly rotating hollow abrasive wheel, to blow the work particles in a direction opposed to the direction of rotation. In a preferred embodiment of the invention, a jet head disposed adjacent to and concentric with the open end of the abrasive wheel, in the hollow inner portion of which work particles are placed, includes a shoulder portion which substantially closes the opening, thus holding the particles inside during rotation. The jet head has several nozzles positioned tangentially at different points on its periphery to direct high velocity streams of gas against the work particles. The force of the jets emerging from the jet head, cause it to rotate.

In accordance with an alternative form of the invention, a pair of substantially identical hollow, abrasive wheels are disposed with open sides adjacent, forming a cylindrical inner chamber within which work particles are rapidly spun on their axes and forced against the abrasive as the wheels are rotated together. A plurality of jet nozzles are inserted at fixed angular positions between the edges of the rotating wheels. These serve to convey high velocity jet streams of gas substantially tangentially against abraded work particles.

Other objects, features and advantages of the invention will be better understood from a study of the specification hereinafter and the attached drawings in which:

Fig. 1A shows a side-elevation, with the outer portion partially broken away, of a preferred embodiment of the invention in which a single abrasive wheel is utilized;

Fig. 1B shows a cross-sectional view of the embodiment of Fig. 1A along the line $x—x'$;

Figure 2A:
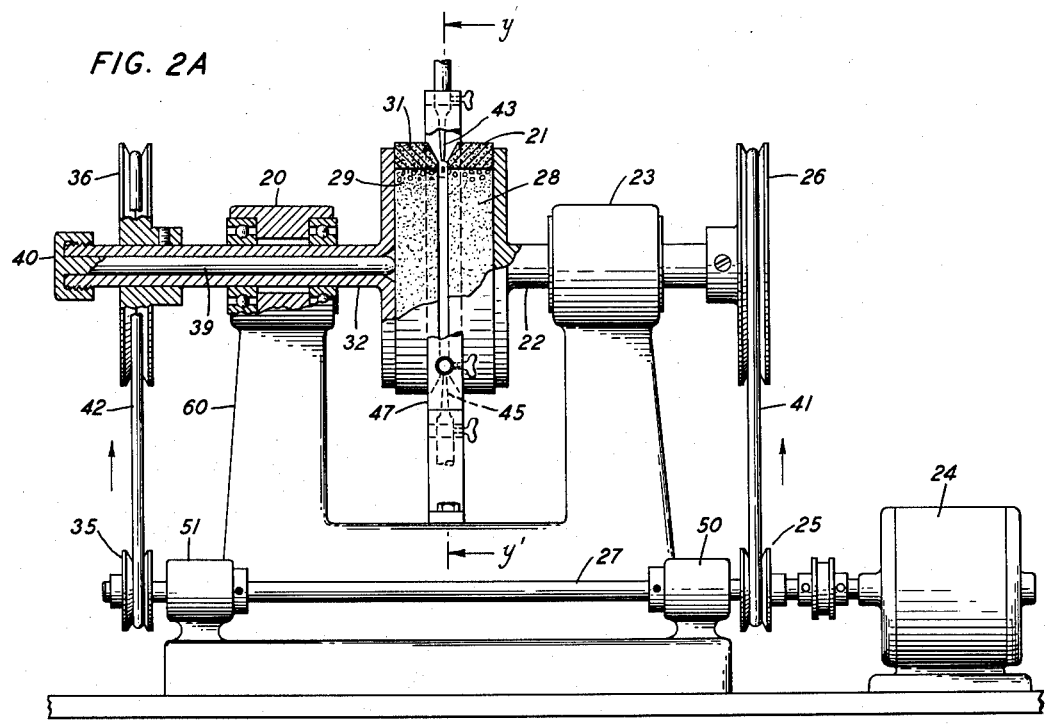
Fig. 2A shows a side elevation, partially broken away, of an alternative embodiment in accordance with the present invention, which utilizes a pair of matched abrasive wheels.

Referring in detail to the embodiment shown in Figs. 1A and 1B of the drawings, an abrasive wheel 1, comprising any abrasive material well known in the art, such as carborundum or the like, is hollowed out to form a cup-shaped, cylindrical chamber 15 having a circular opening on one side of the wheel wherein work pieces 9 comprising, for example, irregular particles of anthracite having a mean cross-sectional dimension of about a tenth of a millimeter, are introduced for rotation. The wheel 1 is mounted for rotation on a shaft 2, supported in the bearing 3, mounted on the base member 16. The shaft 2 is driven to rotate at a rate approximating a few thousand revolutions per minute by a motor 4 acting through a pair of driving wheels 5 and 6 connected by the driving belt 7.

A jet head 11 is mounted coaxially with the wheel 1, on its open side, in such a manner that its shoulder portion 10 substantially closes the hollow chamber 15 of the wheel 1, thereby confining the work particles 9 during rotation. Attached tangentially to the jet head 11 are a plurality of jet nozzles 12 arranged in symmetrical angular relation around the circumference. The jet head 11 is integrally connected to a hollow shaft 13 which serves as a duct for supplying a stream of gas having a velocity, for example of a thousand feet per second, to the nozzles 12 from conventional pumping equipment not shown. Sufficient clearance is allowed between the shoulder portion 10 and one edge of the chamber 15 to allow for escape of air forced into the chamber by the nozzles 12. The shaft 13 is slidably supported in the bearing 14, also mounted on the base member 16. Thus, the chamber 15 may be opened for loading and unloading by laterally moving the jet head 11 with respect to the wheel 1, by sliding the connecting shaft 13.

Accordingly, the work particles 9, placed in the cup-shaped peripheral chamber 15 of the abrasive wheel 1, are driven centrifugally against the inner periphery thereof. Simultaneously, the jet head 11, which during operation is positioned to substantially close the chamber 15, supplies high velocity jets of air or other gas against the periphery of the chamber 15, forcing the jet head 11 to rotate, and forcing the work particles 9 to spin on their axes and to impinge against the periphery of the chamber 15.

Figure 2B:
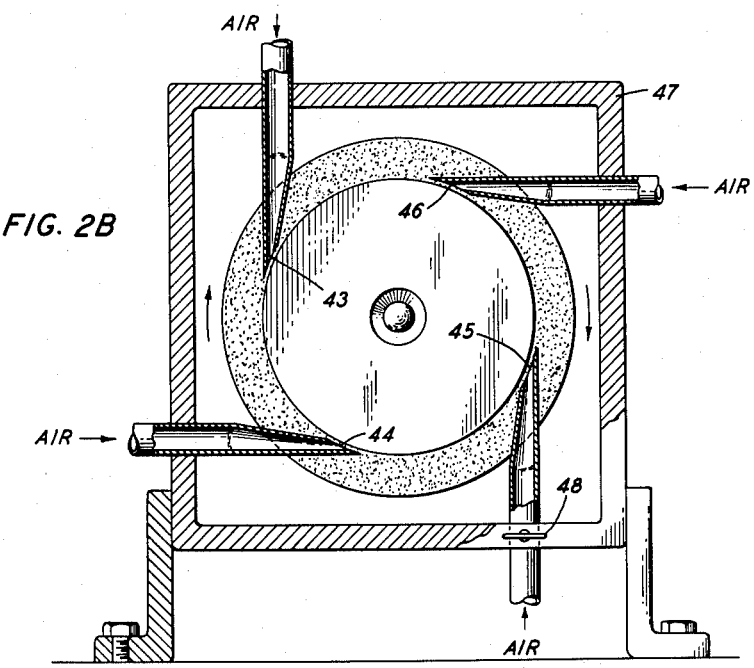
Fig. 2B shows a cross section of the embodiment of Fig. 2A along the dotted line $y—y'$.

The alternative embodiment shown in Figs. 2A and 2B of the drawings comprises a pair of matched abrasive wheels 21 and 31, which are substantially similar in form to the wheel 1 described with reference to Figs. 1A and 1B, except that the open sides are positioned adjacent so as to form an inner chamber 28 in which particles 29 are placed for processing.

The wheels 21 and 31 are mounted on horizontally matched axes 22 and 32, respectively, which are themselves mounted in the bearings 23 and 20, supported on the base member 60. The axes 22 and 32 are driven to rotate synchronously through a conventional driving arrangement which includes the motor 24 connected through a common driveshaft 27 mounted on the bearings 50 and 51 and connected to matched driving wheels 25 and 35. These are mechanically coupled through the respective driving belts 41 and 42 to the corresponding axis driving wheels 26 and 36. It will be noted that the shaft 32 is hollow to facilitate loading and unloading from the chamber 28 and is closed during rotation with an inwardly extending plug 39 which screws into position with a screw head 40.

At four symmetrically spaced positions between the peripheral edges of the rotating abrasive wheels 21 and 31, which in preferred form are spaced closely enough to prevent the escape of work particles, are mounted the finely tapered jet nozzles 43, 44, 45 and 46. These are fixed on the supporting frame 47 so that they blow high velocity streams of gas substantially tangentially against the work particles at four different places on the inner surface of the rotating abrasive wheels 21 and 31. The gas ducts connected to the nozzles 43, 44, 45 and 46, which are fastened on the frame 47 by staples 48 or other conventional means, are connected to a common pumping means, or other source (not shown) of a high velocity stream of gas.

Although the apparatus of the present invention has been described with specific reference to the preparation of carbon microphone material, it is apparent that it is equally applicable to the formation of spherical particles from any solid materials having a hardness which is less than that of the abrasive material of the wheel. The described method and apparatus are also, for example, particularly applicable to the preparation of ferrite crystals in the form of small spheres for experimental purposes, or other spherical particles which cannot be conveniently made by prior art processes including chemical treatment or involving high temperature treatment such as is required for melting and forming by surface tension.

Moreover, it will be apparent to those skilled in the art after a study of the embodiments disclosed herein, that the principles of the present invention can be embodied in other forms than those specifically disclosed herein.

What is claimed is:

1. A device for grinding odd-shaped particles into spheres approximating a millimeter or less in diameter which comprises in combination an abrasive wheel including a substantially cylindrical inner chamber having an annular abrasive surface for abrading a mass of said particles, means including a plurality of nozzles having outlets angularly spaced in the circumferential direction of said wheel for shooting high velocity jets of gas into said chamber at an acute angle to said surface, and means for driving said wheel to rotate relative to the positions of said nozzles in opposition to the direction of said jets.

2. A device for grinding odd-shaped particles into spheres approximating a millimeter or less in diameter which comprises in combination an abrasive wheel hollowed out on one side to include a cylindrical inner chamber having an annular abrasive surface for abrading a mass of said particles, a jet head mounted adjacent the hollow side of said wheel and coaxial therewith, said jet head comprising a plurality of nozzles mounted tangentially thereon in fixed angular relation to one another in the circumferential direction of said wheel said nozzles arranged to blow high speed jets of gas against the particles in said chamber in a direction approximately tangential to said surface, and driving means connected for driving said wheel to rotate in a direction opposing the direction of said jets.

3. A device in accordance with claim 2 wherein said jet head is rotatable in a direction opposite to the direction of rotation of said abrasive wheel.

4. A device in accordance with claim 2 in which means including said jet head is slidably mounted for motion in an axial direction to and from the open side of said abrasive wheel.

5. A device for grinding odd-shaped particles into spheres approximating a millimeter or less in diameter which comprises in combination an abrasive wheel hollowed to include a chamber open on one side and having an annular abrasive surface for abrading a mass of said particles, a jet head mounted coaxially with said wheel and arranged for positioning closely adjacent the open side of said wheel, said jet head comprising a plurality of nozzles mounted substantially tangentially on said head in fixed angular relation to one another in the circumferential direction of said wheel said nozzles arranged to blow high speed jets of gas against the particles in said chamber in a direction making an acute angle with said abrasive surface, and driving means for supplying relative angular motion between said wheel and said nozzles in a direction opposing said jets.

6. A device for grinding small spherical particles which comprises in combination a pair of substantially abrasive wheels, each hollowed out on one side to form a chamber having an annular abrasive surface, said wheels mounted concentrically with the hollow sides with their edges closely adjacent, means for driving said wheels to rotate in synchronism in the same direction, a plurality of nozzles inserted at spaced intervals around the circumference between the adjacent edges of said wheels said nozzles arranged to shoot high velocity jets of gas into the interior of said chambers in a substantially tangential direction with respect to said abrasive surfaces in opposition to the direction of rotation of said wheels.

7. A device for grinding odd-shaped particles into spheres approximating a millimeter or less in diameter, which comprises in combination an abrasive wheel hollowed out on one side to include an inner chamber having an annular abrasive surface for abrading a mass of said particles, a jet head mounted coaxially with and adjacent the hollow side of said wheel and including a shoulder portion substantially closing said chamber, said jet head including a plurality of nozzles mounted tangentially at different annular positions around its periphery and including means for supplying high speed jets of gas to said nozzles directed in an approximately tangential direction against said annular surface, and driving means for driving said wheel to rotate with respect to said nozzles in opposition to said jets.

8. An arrangement for grinding odd-shaped small particles into spherically-shaped particles, said arrangement including means defining a substantially enclosed cylindrical chamber having a circular cross-section and an annular surface of abrasive material, a plurality of means, arranged about a central axis of symmetry coincident with the axis of said cylindrical chamber, for directing a like plurality of streams of gas along paths within said chamber, said paths intersecting said annular surface at a like plurality of positions, said positions being substantially uniformly spaced around said annular surface, said paths intersecting said annular surface at substantially like acute angles with respect to said annular surface at said plurality of positions, respectively, and means for rotating said first stated means about said central axis of symmetry with respect to said plurality of gas directing means in opposition to said streams of gas, whereby odd-shaped small particles placed within said chamber are ground into spherically shaped particles by the combined action on said particles of said streams of gas and the rotating cylindrical chamber and the wear on said annular surface of abrasive material in said chamber is substantially evenly distributed.

9. The method of grinding particles into spheres approximating a millimeter in diameter which comprises abrading a plurality of said particles in the hollow interior of a rotating abrasive wheel against an annular abrasive surface thereof, simultaneously subjecting the said particles at respectively different angular positions around the circumference of said wheel to a plurality of high velocity jets of gas directed approximately tangentially against said surface in opposition to the direction of rotation of said wheel.

10. The method of grinding particles in accordance with claim 9 in which said positions are symmetrically arranged around the axis of said wheel.

References Cited in the file of this patent

UNITED STATES PATENTS

| | | |
|---|---|---|
| 607,368 | Hathorn | July 12, 1898 |
| 639,955 | Warner | Dec. 26, 1899 |
| 1,196,362 | Hull | Aug. 29, 1916 |
| 1,812,313 | Arter | June 30, 1931 |
| 2,175,347 | Granberg | Oct. 10, 1939 |
| 2,330,949 | Braun | Oct. 5, 1943 |

FOREIGN PATENTS

| | | |
|---|---|---|
| 707,628 | Germany | June 27, 1941 |